Sept. 26, 1933.  E. R. GREER  1,927,891
TRACTOR HITCH
Filed June 14, 1932  3 Sheets-Sheet 1

INVENTOR
EDWARD R. GREER
BY *Paul, Paul & Moore*
ATTORNEYS

Sept. 26, 1933.    E. R. GREER    1,927,891
TRACTOR HITCH
Filed June 14, 1932    3 Sheets-Sheet 3
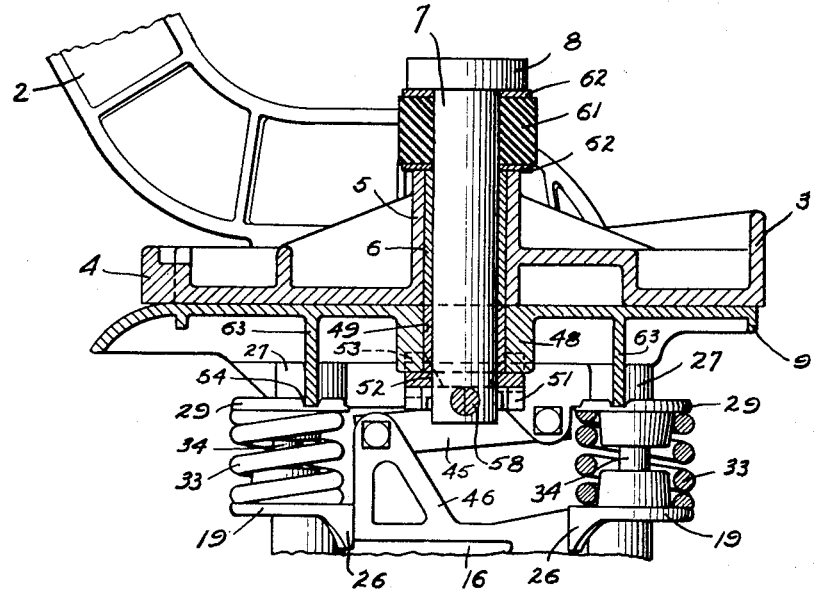
FIG. 7
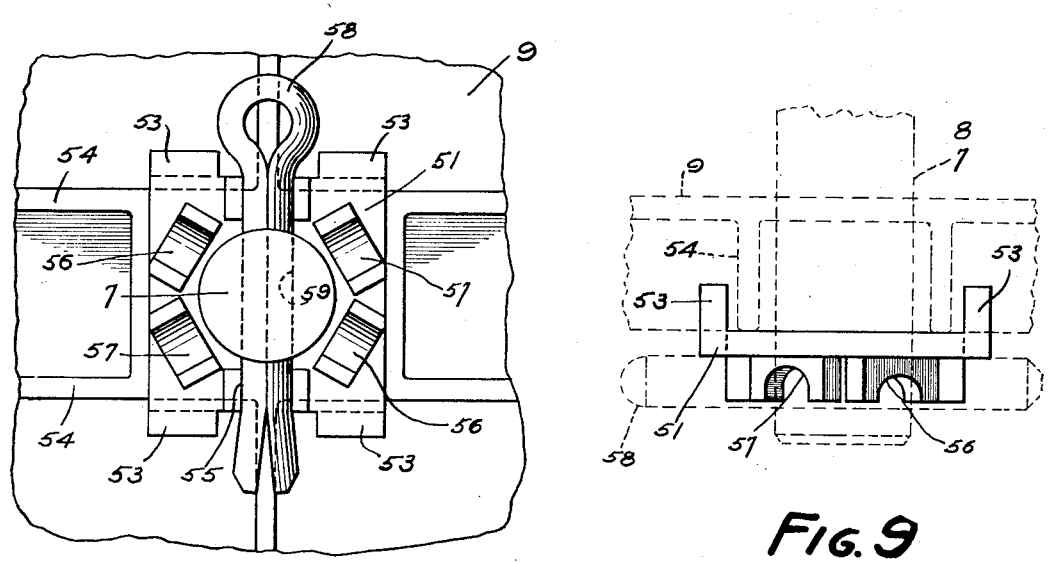
FIG. 8
FIG. 9
INVENTOR
EDWARD R. GREER
BY Paul, Paul & Moore
ATTORNEYS Patented Sept. 26, 1933

1,927,891

UNITED STATES PATENT OFFICE 1,927,891

TRACTOR HITCH

Edward R. Greer, Minneapolis, Minn.

Application June 14, 1932. Serial No. 617,105

23 Claims. (Cl. 280—33.1)

This invention relates to new and useful improvements in tractor hitches, generally, and more particularly to a hitch adapted for use to couple a trailer to a tractor.

An object of the invention is to provide an improved tractor hitch comprising a coupling member adapted to be secured to a trailer and having means for coupling it to a plate which is floatingly supported upon the tractor in a manner to prevent binding or severe strains from being transmitted to the hitch, when the tractor and trailer are traveling over rough, uneven ground.

A further object is to provide a tractor hitch comprising a member adapted to be secured to a trailer, and a pair of rockers being mounted upon the tractor and having suitable spring elements supported at the ends thereof upon which a coupling plate is mounted, and means being provided for pivotally connecting said coupling plate to the member on the trailer.

A further object is to provide a tractor hitch comprising a coupling plate having means for resiliently supporting it upon the tractor and permitting free universal movement thereof, and said plate having means whereby it may be coupled to a trailer to provide a pivotal connection between the trailer and tractor.

Other objects of the invention reside in the novel construction of the means for floatingly supporting the coupling plate upon the tractor; in the construction of the rockers which are pivotally supported upon the tractor and are provided at their ends with suitable holders upon which suitable springs are seated to provide a resilient mounting for the coupling plate; in the means provided between the rockers and the coupling plate, through which the propelling force of the tractor is transmitted to the coupling plate; in the construction of the holders which are mounted for axial movement in the sockets provided at the ends of the rockers, and which have extensions depending below the sockets upon which suitable coiled springs are mounted, which springs act to resist upward axial movement of the holders in said sockets; in the novel construction of the connectors which connect the holders to the members upon which the coupling plate is directly supported, and which permit free floating movement of the coupling plate with respect to the rockers, to thereby prevent unnecessary strains from being transmitted to the coupling plate and member; in the novel construction of the king pin and the means provided in connection therewith for taking up end play in the pin, and also in the yieldable means provided at the upper end thereof which acts to keep the king pin substantially tight longitudinally, and at the same time, permits relative tilting movement of the coupling member upon the coupling plate; and, in the general construction of the tractor hitch which is such as to permit the tractor and trailer to travel over rough uneven ground without danger of severe strains being transmitted to the operating parts of the hitch.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

In the drawings:

Figure 4 is an enlarged detail sectional view on the line 4—4 of Figure 2, showing the means for connecting the spring holders with the coupling plate;

Figure 5 is a detail sectional view on the line 5—5 of Figure 4;

Figure 6 is a perspective view showing one of the connectors removed from its supporting means and showing the T-shaped heads provided at the ends thereof;

Figure 7 is a vertical sectional view on the line 7—7 of Figure 2, showing the yieldable means provided at the upper end of the king pin;

Figure 8 is a bottom view of the king pin, as shown in Figure 7, on an enlarged scale, showing the means provided for taking up end play therein, due to wear; and Figure 9 is a detail view showing the notched plate provided at the bottom of the king pin with which the cotter pin is engaged.

Figure 1:
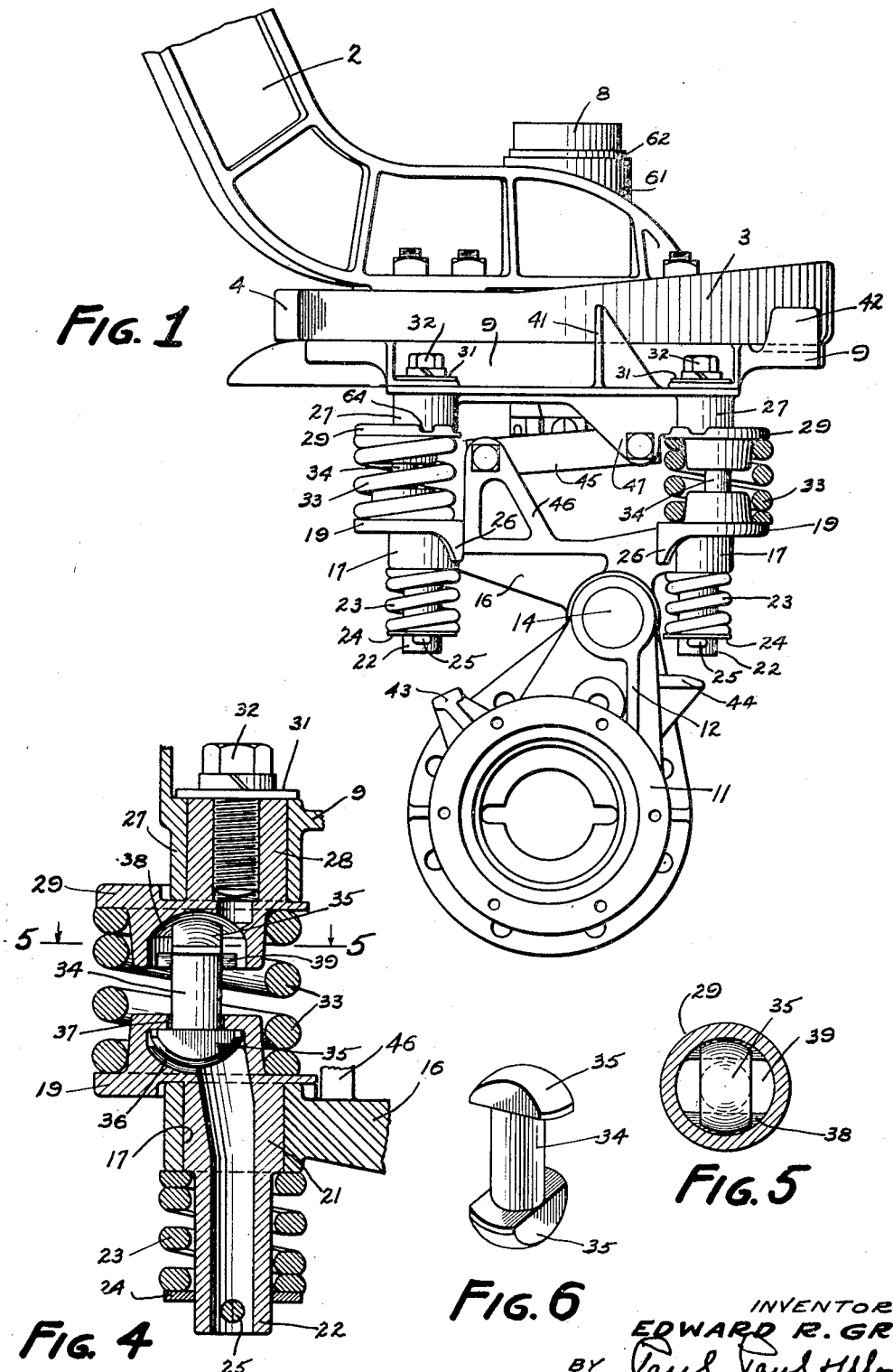
Figure 1 is a view showing a portion of a trailer with the hitch in operative position thereon, as when the trailer is coupled to a tractor.
Figure 2:
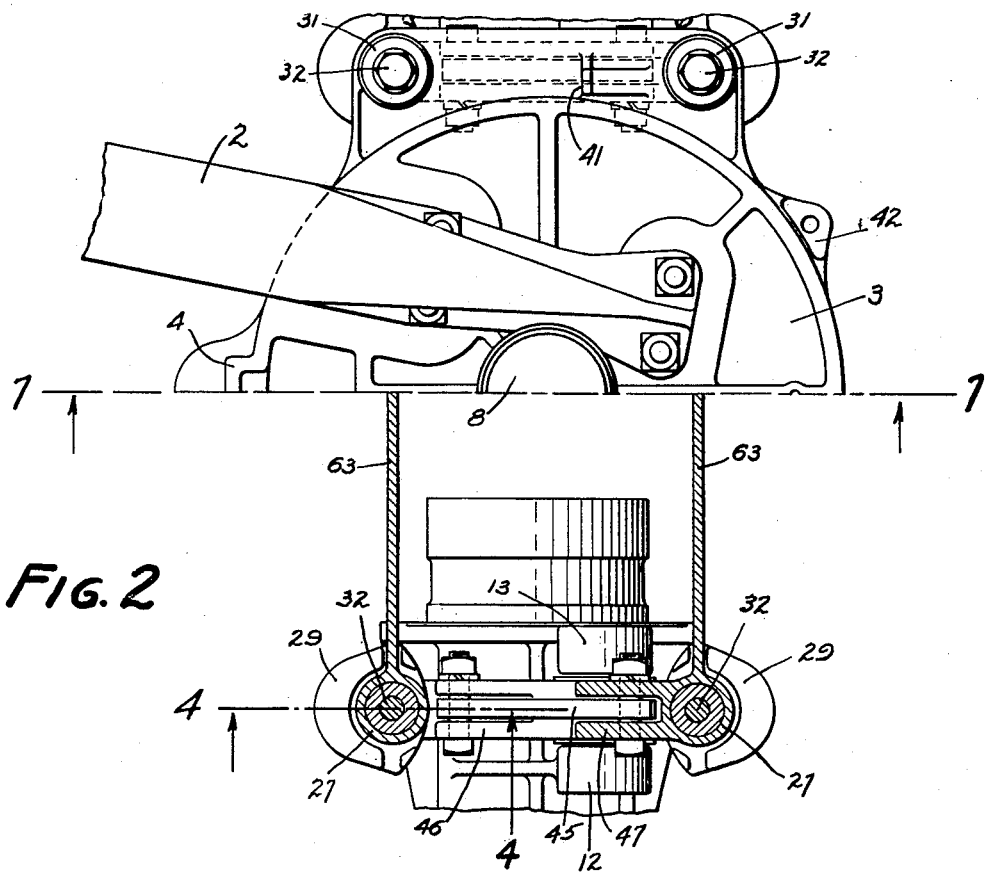
Figure 2 is a plan view of Figure 1, partially in section.
Figure 3:
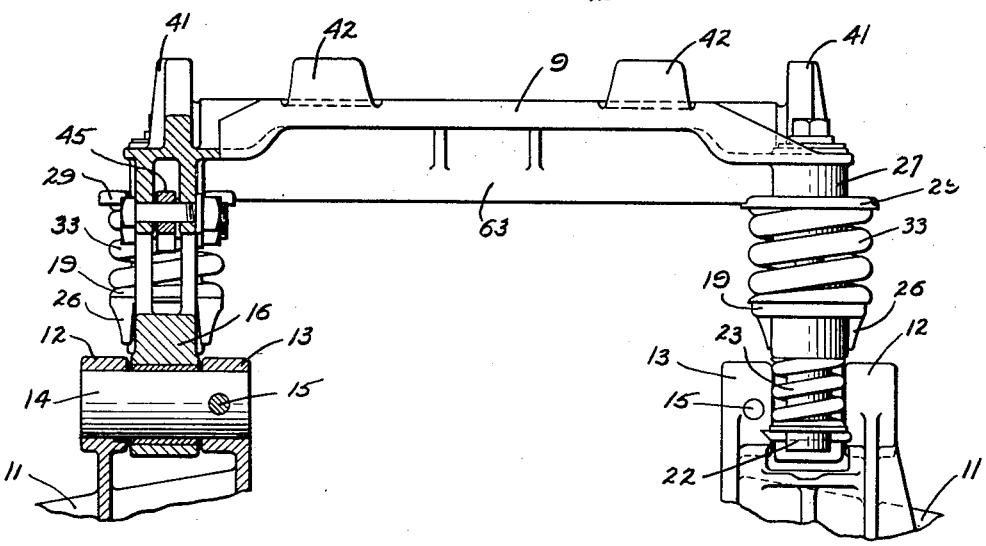
Figure 3 is a front view of that portion of the hitch which is supported directly upon the tractor.

In the selected embodiment of the invention here shown, there is illustrated in Figures 1 and 2, the forward end portions of a pair of draft beams 2 of a suitable trailer, not shown, having secured thereto a coupling member 3, which preferably is circular in configuration, as shown in Figure 2. The member 3 is provided at its rear portion with an outwardly projecting lug 4 and has a central hub 5, shown provided with a suitable bushing 6 adapted to receive a king pin 7, provided with a suitable head 8.

A suitable coupling plate 9 is adapted to be secured to a tractor and an important feature of this invention resides in the means provided for resiliently and floatingly supporting the coupling plate 9 upon the rear portion of the tractor.

The means provided for thus supporting the plate 9 upon the tractor is best shown in Figures 1 and 4 and comprises a pair of brackets 11 adapted to be fitted onto and secured to the rear axle housing of the tractor, not shown. The brackets 11 are provided with spaced apart arms 12 and 13 apertured to receive suitable trunnions 14 which may be secured in position in said arms by suitable pins 15. Rockers 16 are mounted upon the trunnions 14 and these rockers are provided at their ends with suitable sockets 17 adapted to receive suitable spring holders 19 having portions 21 received in the sockets 17, as shown in Figure 4. Each holder portion 21 is provided with a depending extension 22 adapted to support a suitable coiled spring 23, which springs are secured to the extensions 22 by suitable washers 24 and pins 25. The upper ends of the springs 23 bear against the lower faces of the hubs provided at the ends of the rockers 16 and their lower ends are seated against the washers 24, as clearly shown in Figure 4. Each holder 19 is provided with a pair of depending lugs 26 adapted to straddle the rockers 16 so as to prevent the holders 19 from relatively rotating upon the rocker, as will be clearly understood by reference to Figures 1 and 4. The holders 19 are adapted for vertical movement in the sockets 17 but are resisted from such movement by the action of the springs 23.

The coupling plate 9 is provided at its opposite sides with depending hubs 27, preferably arranged as shown in Figure 2. These hubs are bored to receive the cylindrical portions 28 of a plurality of spring holders or members 29, as shown in Figure 4. The cylindrical portions 28 are retained in the bores of the hubs 27 by suitable washers 31 and bolts or screws 32.

Suitable supporting springs 33 are seated upon the lower spring holders 19 and the upper spring holders 29 of the coupling plate 9 are supported directly upon the upper ends of the springs 33, as clearly illustrated in Figure 4. The springs 33 resiliently support the coupling plate 9 upon the rockers 16, as will readily be understood by reference to Figures 1 and 4.

The holders 19 and 29 of each spring 33 are operatively connected together by means of suitable connectors 34 provided at their ends with T-shaped heads 35. The heads of each connector 34 are arranged in right angular relation to one another, as best shown in Figure 6, for purposes which will subsequently be described. Each spring holder 19 is provided with a cavity 36 having an elongated opening 37 in the upper wall thereof, through which a T-shaped head 35 of one of the connectors 34 may be inserted, as shown in Figure 4. When the head 35 of the connector is inserted into the cavity 36 and is rotated substantially 90° therein, the opposite end portions of the head 35 will be positioned beneath the upper walls of the cavity 36, as shown in Figure 4, so as to prevent the head from becoming detached from the holder 19. In like manner, each upper spring holder 29 has a cavity 38 which in like manner, are provided with elongated openings 39 in the lower walls thereof, adapted to receive the heads 35 at the opposite ends of the connectors 34. Suitable means, not shown, is provided for preventing the connectors 34 from relatively rotating with respect to the holders 19 and 29 when the apparatus is in use. To insert the heads 35 of the connectors 34 into the cavities 36 and 38 of the holders 19 and 29, respectively, the upper holders 29 are preferably released from the hubs 27 of the lower coupling plate 9, whereby the holders 29 may be rotated approximately 90° so as to bring the slotted openings 39 thereof into registration with the upper heads 35 of the connectors 34, as will readily be understood by reference to Figures 4 and 5. The holders 19 and 29 are then returned to their normal positions, as shown in Figure 4, after which the coupling plate is secured thereto by the washers 31 and bolts 32, as hereinbefore stated. The heads 35 of the connectors 34 are loosely supported within the cavities 36 and 38, so as to permit the coupling plate 9 to relatively move within certain limits in a horizontal plane, whereby the coupling plate 9 will be floatingly supported upon the rockers 16. When the tractor and trailer are operating under normal conditions, no strains will be transmitted to the connectors 34, but should the tractor pass over rough and uneven ground so that a lateral rocking motion is imparted to the tractor and trailer in opposite directions, then the connectors 34 may at times, be put under tension as will readily be understood by reference to Figures 1 and 4. The connectors 34 therefore limit the upward movement of the holders 29 with respect to the lower holders 19. Should the hitch be subjected to a severe lateral twisting action, then the portions 21 of the holders 19 may be moved upwardly in the sockets 17 provided at the ends of the rockers 16 against the tension of the springs 23. The springs 23 as shown in Figure 4, are comparatively lighter than the supporting springs 33, as the former springs merely act as a cushioning means for the holders 19 to resist their relative upward movement when the hitch is being subjected to severe lateral or twisting strains.

Suitable upstanding lugs 41 are provided upon the lower coupling plate 9 adapted to be engaged by the rearwardly projecting lug 14 of the coupling member 3 to thereby limit the turning movement of the tractor with respect to the trailer. Suitable abutment lugs 42 are also provided upon the forward portion of the coupling plate 9 adapted to be engaged by the forward portion of the coupling member 3 to limit the relative forward movement thereof, with respect to the lower coupling plate 9 when the trailer is being coupled to the tractor.

Suitable limiting stops 43 and 44 are also provided upon the brackets 11 which support the rockers 16. These limit stops are adapted to be engaged by the lower end portions of the depending extensions 22 of the spring holders 19, as indicated in Figure 1.

The propelling force of the tractor is transmitted to the coupling plate 9 through a pair of thrust links 45 having their end portions pivotally connected to lugs 46 and 47 provided respectively upon the rockers 16 and coupling plates 9, as best shown in Figure 1. These thrust links relieve the springs 33 of the propelling force transmitted from the tractor to the coupling plate 9, and because of the loose pivotal connections between the links 45 and the lugs 46 and 47, the coupling plate 9 is adapted to move freely in a horizontal plane within certain limits, and the coupling plate 9 is thus floatingly and resiliently supported upon the springs 33 in such a manner as to relieve said springs of the usual propelling force of the tractor.

Another important feature of this invention resides in the construction of the novel means provided for coupling together the coupling member 3 and coupling plate 9, in such a manner that the coupling member is permitted to tilt upon the coupling plate 11 when the tractor and trailer pass over uneven ground.

As shown in Figures 7, 8, and 9, the coupling plate 9 has a depending central hub 48, which is bored to receive a suitable bushing 49, as shown. When the coupling member 3 is positioned upon the coupling plate 9, as shown in Figures 1, 2, and 7, the bores in the hubs 5 and 48 of the coupling member 3 and coupling plate 9, respectively, will be alined so as to permit the king pin 7 to be inserted therethrough, as shown in Figure 7. A locking plate 51 is provided with an aperture 52 adapted to receive the lower end of the king pin 7, as shown in Figures 7 and 8, and this plate is adapted to be seated against the lower face of the hub 48 of the coupling plate 9, and is prevented from relative rotation thereon by means of a plurality of upwardly extending lugs 53 adapted to engage the outer faces of a pair of longitudinally extending ribs 54 preferably integrally formed with the coupling plate 9, as indicated in Figures 8 and 9.

To take up end play in the king pin 7, the locking plate 51 is provided upon its lower face with a series of spaced recesses 55, 56, and 57 arranged in pairs around the aperture 52 in the plate 51, as best shown in Figure 8. The bottoms of the recesses 55, 56, and 57 are disposed at different elevations so that as the king pin and the parts associated therewith become worn, the cotter pin 58 provided at the bottom of the king pin for securing it in position, is removed from the king pin and the latter rotated so as to bring the aperture 59 provided therein for the cotter pin 58, into alinement with another pair of recesses 56, the bottoms of which will be spaced a greater distance from the adjacent face of the locking plate 51. When the cotter pin is again inserted into the aperture 59 provided at the bottom of the king pin, its axis will be spaced a greater distance from the adjacent face of the locking plate 51, whereby the head 8 of the king pin will be drawn downwardly into closer relationship with the upper face of the hub 5 of the coupling member 3. It will thus be noted that by disposing the bottoms of the recesses 55, 56, and 57 at different elevations, end play in the king pin may be taken up by simply positioning the cotter pin as hereinbefore described.

Another important feature of this invention resides in the means provided in connection with a king pin for permitting the coupling member 3 to relatively tilt upon the lower coupling plate 9 when the trailer and tractor travel over rough ground.

As shown in Figure 7, a yieldable element 61 preferably of a suitable resilient material such as rubber, is mounted upon the king pin 7 between the upper end of the hub 5 of the coupling member 3 and the head 8 of the king pin. Suitable metallic washers or wear plates 62 are provided at each end of the element 61 to protect it against wear. The overall length of the element 61 is such that when the parts are assembled as shown in Figure 7, and the cotter pin 58 is secured in the lower end of the king pin, the latter will be held in position and the compressibility of the resilient element 61 will permit the coupling member 3 to slightly tilt upon the coupling plate 9 without imparting severe strains to the tractor hitch, as a whole.

From the foregoing, it will be noted that the tractor hitch is floatingly supported upon the tractor and has free universal movement within certain limits in a horizontal plane. The springs 33 and 23 resiliently support the coupling member and plate and the forward end portion of the trailer upon the tractor in such a manner as to avoid shocks and unnecessary strains from being imparted to the hitch, and also whereby the tractor and trailer may pass over very rough and uneven ground without causing any severe strains to be transmitted to any part of the hitch. This is of particular value in a tractor hitch, because of the fact that it is often necessary to move the tractor and trailer over fills and ditches which may cause a rolling movement to be imparted to the tractor and trailer which would impart severe strains to the hitch if the latter were not constructed to permit the tractor and trailer to thus relatively move with respect to one another when traveling over rough uneven ground.

The connectors 34 provided between the spring holders 19 and 29 are important in that they permit free lateral movement of the coupling plate 9 with respect to the rockers, and they also limit the upward movement of the holders 29 with respect to the holders 19. The cylindrical portions 21, and also the extensions 22 of the lower spring holders 19 are preferably hollow, as shown in Figure 4, so as to permit dirt and other matter which might find its way into the cavities 36, to discharge therefrom onto the ground. The upper spring holders 29 are prevented from relatively rotating in the hubs 27 by means of the cross ribs 63 of the coupling plate 9, the edges of which ribs are received in suitable notches 64 provided in the upper portions of the holders 29 as will be noted by reference to Figure 7.

The hitch is very simple in construction and has been found very practical in operation when used in connection with a tractor and a trailer. By supporting the lower coupling plate upon the rockers 16, as herein disclosed, the coupling plate 9 is resisted against movement in a downward direction by the action of the relatively heavier compression springs 33 and in an upward direction by the relatively lighter springs 23, as will readily be understood by reference to Figures 1 and 4.

I claim as my invention:

1. A tractor hitch comprising a coupling member adapted to be secured to a trailer, suitable supports on the tractor, spring elements mounted upon said supports, a coupling plate supported upon said spring elements, a king pin for coupling said plate to said member; and a pivoted link for transmitting the propelling force of the tractor from said supports to said plate.

2. A tractor hitch comprising a coupling member adapted to be secured to a trailer, movable supports on the tractor, spring elements mounted upon said supports, a coupling plate supported upon said spring elements, a king pin for coupling said plate to said member, pivoted means for transmitting the propelling force of the tractor from the supports to said plate permitting free floating movement of the plate, and means for limiting the up-and-down movement of said plate with respect to said supports.

3. A tractor hitch comprising a coupling member adapted to be secured to a trailer, rockers mounted upon the tractor, spring elements mounted at the ends of said rockers, a coupling plate supported upon said spring elements, means for coupling said plate to said member, and horizontally disposed thrust links operatively connecting said plate to the rockers and permitting free floating movement of the plate with respect thereto.

4. A tractor hitch comprising a coupling member adapted to be secured to a trailer, rockers mounted upon the tractor and provided with suitable holders, spring elements seated on said holders, a coupling plate supported upon said spring elements, a king pin for coupling said plate to said member, and thrust links connecting said plate to said rockers and permitting free floating movement of the plate with respect thereto.

5. A tractor hitch comprising a coupling member adapted to be secured to a trailer, rockers mounted upon the tractor and having sockets at the ends thereof, holders mounted for pivotal movement in said sockets, spring elements seated on said holders, a coupling plate supported on said spring elements, means for coupling said plate to said member, and connectors connecting said holders with said plate and permitting free universal movement of the plate with respect to said holders.

6. A tractor hitch comprising a coupling member adapted to be secured to a trailer, supports mounted upon the tractor and having suitable sockets at the ends thereof, holders movably supported in said sockets, spring elements seated on said holders, a coupling plate supported on said spring elements, means for coupling said plate to said member, connectors having T-heads loosely connected to said holders, and means for connecting the opposite ends of said connectors with said plate and permitting free universal movement of the plate with respect to said holders.

7. A tractor hitch comprising a coupling member adapted to be secured to a trailer, rockers mounted upon the tractor and having suitable sockets at the ends thereof, holders movably mounted in said sockets, spring elements seated on said holders, a coupling plate supported on said spring elements, means for coupling said plate to said member, connectors connecting said holders with said plate and permitting free universal movement of the plate with respect to said rockers, and thrust members pivotally connected to said rockers and to said plate for transmitting the propelling force of the tractor to said plate.

8. A tractor hitch comprising a coupling member adapted to be secured to a trailer, rockers mounted upon the tractor and having suitable sockets at the ends thereof, holders movably supported in said sockets and having raised portions, spring elements seated on said holders, a coupling plate supported on said spring elements, means for coupling said plate to said member, connectors having T-heads loosely connected to said holders and having their opposite ends connected with said plate, said connectors permitting free universal movement of the plate with respect to said holders, and means for transmitting the propelling force of the tractor from the rockers to said plate.

9. A tractor hitch comprising a coupling member adapted to be secured to a trailer, supports movably mounted upon the tractor and having suitable sockets at the ends thereof, holders movably supported in said sockets, spring elements seated on said holders, a coupling plate supported on said spring elements, means for coupling said plate to said member, connectors connecting said holders with said plate and permitting free universal movement of the plate with respect to said holders, and thrust members pivotally connected to said rockers and to said plate for transmitting the propelling force of the tractor to said plate.

10. A tractor hitch comprising a coupling member adapted to be secured to a trailer, rockers mounted upon the tractor and having suitable sockets at the ends thereof, holders mounted for axial movement in said sockets and having extensions depending below the sockets, spring elements seated on said holders, a coupling plate supported on said spring elements, means for coupling said plate to said member, connectors connecting said holders with said plate and permitting free universal movement of the plate in a horizontal plane, and yieldable means connected with said extensions and resisting relative axial movement of the holders in said sockets.

11. A tractor hitch comprising a coupling member adapted to be secured to a trailer, rockers mounted upon the tractor and having suitable sockets at the ends thereof, holders mounted for axial movement in said sockets and having extensions depending below the sockets, spring elements seated on said holders, a coupling plate, means secured to said plate and seated upon the upper ends of said spring elements and cooperating therewith to provide a resilient support for the plate, means for coupling said plate to said member, and connectors inseparably connecting said holders to the means on said plate and permitting free universal movement of the plate in a horizontal plane.

12. A tractor hitch comprising a coupling member adapted to be secured to a trailer, rockers mounted upon the tractor and having sockets at the ends thereof, holders having portions received in said sockets and provided with extensions depending below the sockets, means for preventing said holders from relatively rotating in said sockets, spring elements seated on said holders, a coupling plate, means secured to said plate and operatively connecting the upper ends of said spring elements therewith, means for coupling said plate to said member, connectors inseparably connecting said holders to the means on said plate and permitting free universal movement of the plate in a horizontal plane, and means for limiting the up-and-down movement of said plate with respect to said rockers.

13. A tractor hitch comprising a coupling member adapted to be secured to a trailer, rockers mounted upon the tractor and having sockets at the ends thereof, holders having portions received in said sockets and provided with extensions depending below the sockets, spring elements seated on said holders, a coupling plate, means secured to said plate and operatively connecting the upper ends of said spring elements therewith, means for coupling said plate to said member, connectors connecting said holders to the means on said plate and permitting free universal movement of the plate in a horizontal plane, and yieldable means connected with said extensions and resisting relative axial movement of the holders in said sockets.

14. A tractor hitch comprising a coupling member adapted to be secured to a trailer, supports on the tractor a coupling plate resiliently supported upon said supports, a king pin having a head, substantially horizontally disposed thrust links connecting said plate with said supports said member and plate having bores therein adapted to be alined to receive the king pin to couple the trailer to the tractor, means for securing the king pin in said bores, and yieldable means interposed between the head of the king pin and said coupling member and permitting said member to relatively tilt on said plate.

15. A tractor hitch comprising a coupling member adapted to be secured to a trailer, supports on the tractor a coupling plate movably supported upon said supports, a king pin having a head, thrust links connecting said plate with said supports said member and plate having bores therein adapted to be alined to receive said king pin to couple the trailer to the tractor, means for taking up end play in the king pin, and yieldable means interposed between the head of said king pin and said coupling member and permitting said member to relatively tilt on said plate.

16. A tractor hitch comprising a coupling member adapted to be secured to a trailer, supports pivotally mounted upon the tractor, a coupling plate, means resiliently supporting said plate upon said pivoted supports, thrust links pivotally connected to said plate and to said supports and disposed lengthwise of the tractor a king pin having a head at one end, said member and plate having bores therein adapted to be alined to receive said king pin to couple the trailer to the tractor, means for taking up end play in the king pin, and yieldable means interposed between the head of the king pin and said coupling member and permitting said member to relatively tilt on said plate.

17. A tractor hitch comprising a coupling member adapted to be secured to a trailer, a coupling plate floatingly supported upon the tractor, a king pin, said member and plate having bores therein adapted to receive said king pin to couple the trailer to the tractor, a head on one end of the pin, a locking plate apertured to receive the lower end of the king pin and having a plurality of concaved recesses in its bottom face arranged at different elevations, a lock pin secured in the lower end of the king pin and adapted to be seated in certain of said recesses, means on said locking plate engaging said coupling plate to prevent relative rotation of the locking plate, and a yieldable element on the king pin between its head and the adjacent end of the hub of said coupling member, said yieldable element permitting the coupling member to relatively tilt on said plate, when the apparatus is traveling over rough, uneven ground.

18. A tractor hitch comprising a coupling member adapted to be secured to a trailer, supports pivotally mounted upon the tractor, a coupling plate, means resiliently supporting said plate upon said pivoted supports, a king pin having a head at one end, said member and plate having bores therein adapted to be alined to receive said king pin to couple the trailer to the tractor, a locking plate apertured to receive the lower end of the king pin and adapted to be seated against a lower face of the coupling plate, said locking plate having a plurality of concaved recesses in its bottom face disposed at different elevations, and a lock pin received in an aperture in the lower end of the king pin and adapted to be selectively engaged with said recesses to take up end play in the king pin.

19. A tractor hitch comprising a coupling member adapted to be secured to a trailer, a coupling plate floatingly supported upon the tractor, a king pin, said member and plate having bores therein adapted to receive said king pin to couple the trailer to the tractor, a head on one end of the pin, a locking plate apertured to receive the opposite end of the king pin, a cotter pin in the king pin cooperating with said locking plate to secure the king pin in position in said bores, a plurality of recesses in said plate adapted to be selectively engaged by said cotter pin and whereby end play in the king pin may be taken up, and a yieldable element mounted upon the king pin and permitting the coupling member to relatively tilt on said plate, when the apparatus is traveling over rough, uneven ground.

20. A tractor hitch comprising a coupling member adapted to be secured to a trailer, a coupling plate floatingly supported upon the tractor, a king pin, hubs on said member and plate having bores therein adapted to receive said king pin to couple the trailer to the tractor, a head on one end of the king pin, a lock pin at the opposite end of the king pin for securing it in position in said bores, a yieldable element on the king pin between its head and the adjacent end of the hub of said coupling member, said yieldable element permitting the coupling member to relatively tilt on said plate, when the apparatus is traveling over rough, uneven ground, a locking plate on the lower end of the king pin adapted to engage the lower face of the hub of the coupling plate, recesses in the lower face of said locking plate adapted to be selectively engaged by said lock pin, said recesses being arranged at different elevations whereby end play in the king pin may be taken up, and projections on said locking plate engaging said coupling plate to prevent relative rotation of the locking plate.

21. A tractor hitch comprising a coupling member adapted to be secured to a trailer, supports on the tractor, a coupling plate movably mounted upon said supports, and thrust links pivotally connected to said supports and to said plate for transmitting the propelling force of the tractor to the plate.

22. A tractor hitch comprising a coupling member adapted to be secured to a trailer, supports on the tractor, a coupling plate resiliently mounted upon said supports, thrust links pivotally connected to said supports and to said plate for transmitting the propelling force of the tractor to the plate, and means for limiting the upward movement of said plate with respect to said supports.

23. A tractor hitch comprising a coupling member adapted to be secured to a trailer, supports on the tractor, a coupling plate resiliently supported upon said supports, thrust links pivotally connected to said supports and to said plate for transmitting the propelling force of the tractor to the plate, and loosely mounted connectors operatively connecting said plate with said supports for limiting the upward movement of the plate with respect to said supports.

EDWARD R. GREER.